(12) United States Patent  
Londeree et al.

(10) Patent No.: US 8,515,269 B2
(45) Date of Patent: Aug. 20, 2013

(54) TOWABLE DIRECTED-VIEW UNDERWATER CAMERA CARRIER

(76) Inventors: Robert Bradley Londeree, Windermere, FL (US); Robert Douglas Londeree, Windermere, FL (US)

( * ) Notice: Subject to any disclaimer, the term of this patent is extended or adjusted under 35 U.S.C. 154(b) by 83 days.

(21) Appl. No.: 13/217,647

(22) Filed: Aug. 25, 2011

(65) Prior Publication Data

US 2013/0051779 A1    Feb. 28, 2013

(51) Int. Cl.
*G03B 17/08* (2006.01)
(52) U.S. Cl.
USPC ............................................................ 396/25
(58) Field of Classification Search
USPC ..................................................... 396/25–29
See application file for complete search history.

(56) References Cited

U.S. PATENT DOCUMENTS

| | | | | |
|---|---|---|---|---|
| 5,237,952 | A * | 8/1993 | Rowe | 114/332 |
| 6,738,314 | B1 * | 5/2004 | Teeter et al. | 367/131 |
| 6,802,236 | B1 * | 10/2004 | Richardson | 89/1.13 |
| 2004/0076415 | A1 * | 4/2004 | Da Silva | 396/25 |
| 2004/0083940 | A1 * | 5/2004 | Shelton et al. | 114/312 |
| 2005/0036031 | A1 * | 2/2005 | Weber | 348/81 |
| 2005/0066872 | A1 * | 3/2005 | Geriene et al. | 114/312 |
| 2006/0216007 | A1 * | 9/2006 | Moreb | 396/25 |
| 2007/0125289 | A1 * | 6/2007 | Asfar et al. | 114/312 |

* cited by examiner

*Primary Examiner* — Clayton E LaBalle
*Assistant Examiner* — Dennis Hancock
(74) *Attorney, Agent, or Firm* — Daniel Law Offices, P.A.; Jason T. Daniel, Esq.

(57) ABSTRACT

A towable directed-view underwater camera carrier device for use while fishing includes a main body having a pair of outwardly projecting horizontal fins, an outward projecting vertical fin, a hydrodynamic bulbous nosecone at least one outward projecting guide fin for receiving a tow line, and a cavity for securely positioning a rear facing camera.

12 Claims, 8 Drawing Sheets

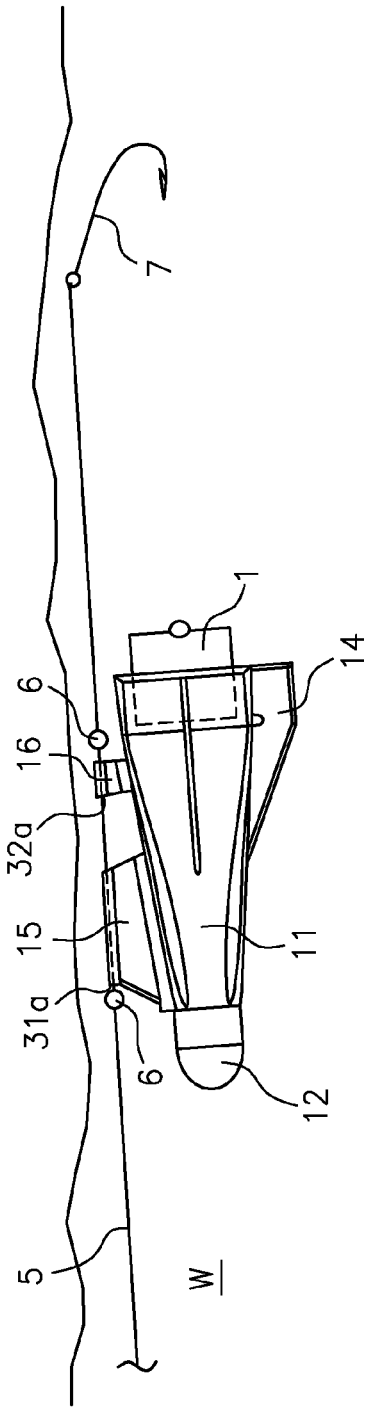
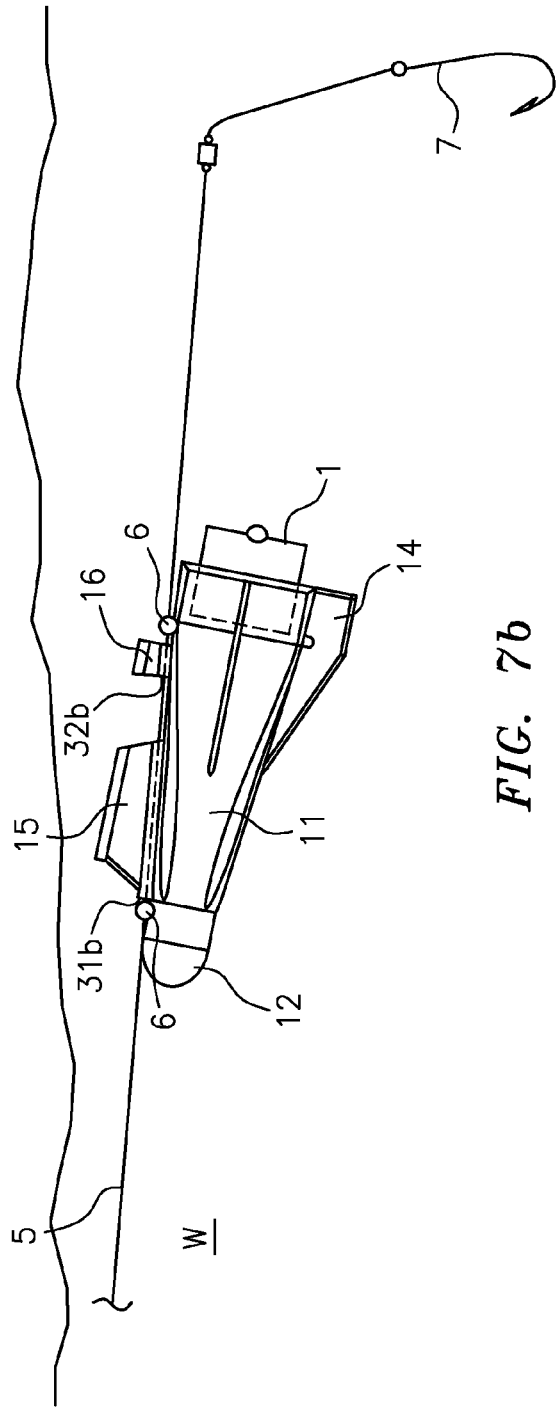
FIG. 7a
FIG. 7b

TOWABLE DIRECTED-VIEW UNDERWATER CAMERA CARRIER

BACKGROUND

Field of the Invention

The present invention relates generally to underwater devices, and more particularly to a towable underwater camera holder for use in professional, sport or recreational fishing.

Underwater cameras and waterproof camera housings are well known. Each of these devices allow a user to take still or moving pictures of an underwater environment without causing damage to the camera equipment. However, these devices are limited in their usefulness owing to the design of the camera/case housing which must typically be held and positioned underwater manually by a user.

With regard to fishing, the interaction between the fish and the bait is critical for success. Many attempts have been made to study this interaction by capturing the underwater portion of fishing via a camera that is most often operated by a diver or affixed to the bottom of a boat. Unfortunately, bait tied to the end of a fishing line moves in unpredictable ways which often results in the boat camera being unable to capture the interaction. Additionally, the mere presence of underwater divers, tends to scare fish away and is extremely cost prohibitive for the average fisherman. Moreover, neither of these options can be utilized when the bait/fishing line is moving through the water, (i.e. trolling).

For these reasons, it would be beneficial to provide a device capable of securely positioning an underwater camera in a manner suitable for capturing the interaction between a fish and a fishing lure/bait that is repeatable, cost efficient and does not require a diver.

The present invention, directed to a towable directed-view underwater camera carrier differs from the foregoing prior art in a number of aspects. The manner by which will become more apparent in the description which follows, particularly when read in conjunction with the accompanying drawings.

SUMMARY OF THE INVENTION

The present invention is directed to a towable directed-view underwater camera carrier device for use while fishing. One embodiment of the present invention can include a main body having a pair of outwardly projecting horizontal fins, an outward projecting vertical fin, a hydrodynamic bulbous nosecone at least one outward projecting guide fin for receiving a tow line, and a cavity for securely positioning a rear facing camera.

Another embodiment of the present invention can include a hollow interior portion configured to receive ballast, a removable nosecone and the ability to independently orient the fins.

Yet another embodiment of the present invention can include a waterproof casing for securely and safely positioning a camera underwater in a rear facing direction.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 7a illustrates the device in operation, in accordance with one embodiment.

FIG. 7b illustrates the device in operation, in accordance with another embodiment.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
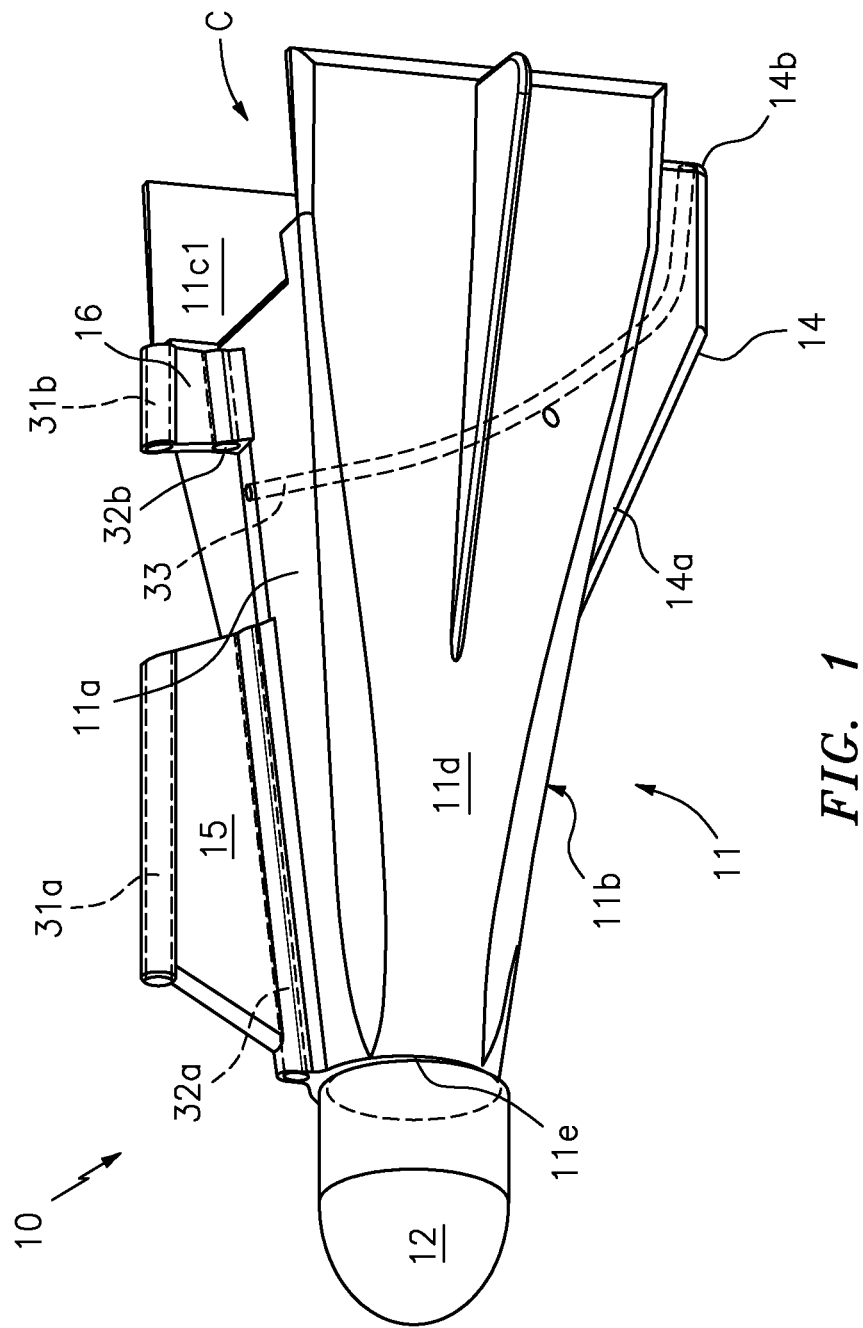
FIG. 1 is a perspective view of a towable directed-view underwater camera carrier that is useful for understanding the inventive concepts disclosed herein.

For purposes of this description, the terms "upper," "bottom," "right," "left," "front," "vertical," "horizontal," and derivatives thereof shall relate to the invention as oriented in FIG. 1.

FIGS. 1-4 illustrate one embodiment of a towable directed-view underwater camera carrier that is useful for understanding the inventive concepts disclosed herein. The device 10 can include a main body 11 having a removable hydrodynamic cone 12, a cavity C and a plurality of guide channels 31-33.

The main body can act as a vessel for securely towing and positioning an underwater camera 1 in a particular direction. Owing to the design of the main body 11, the device can be equally utilized in a stationary or moving environment. In one embodiment, the main body 11 can include a generally frustum-like pyramid shape having a top section 11a, a bottom section 11b, opposing side sections 11c and 11d, a back section 11e, and an open front section 11f defining a cavernous interior space 11g. It is preferred that the device be constructed from a hardened waterproof polymer, such as plastic, for example, that is capable of sustaining long periods under water without deteriorating.

A bulbous/pointed nosecone 12 can be removably secured to the front of the main body for allowing access to the cavernous interior 11g. In one preferred embodiment the nose can be secured to the main body via a plurality of threads 11f1 positioned along the front of the device. Such a feature can be useful for adding weighted ballast for allowing the device to achieve varying levels of buoyancy, for example. Of course other uses are also contemplated.

In one alternate embodiment (not illustrated) an optional spring or other retention device can be positioned within the cavernous interior 11g in order to allow a user to position the ballast at a desired location within the cavity. Such a feature can act to better trim the attitude and pitch of the device while traveling through the water.

A pair of horizontal fins 13 can be positioned on each of the side sections of the main body 11 11c and 11d. The horizontal fins 13 can include a leading edge 13a that gradually sweeps back and away from the main body 11 until terminating at trailing edge 13b which has a generally orthogonal relationship with the main body 11.

A vertical fin 14 can be positioned along the bottom section of the main body 11b, and can include a leading edge 14a, a trailing edge 14b and a top section 14c. In one embodiment, both the trailing edge 14b and the top section 14d can be located behind the back section of the main body 11e.

As described herein, each of the fins 13 and 14 can act to orient the device 10 in a precise and upright manner by controlling the vertical and horizontal pitch/angle of the device 10 while in motion. As the use and construction/orientation of underwater stabilizers/wings are extremely well known in the art, no further description will be provided. Additionally, although illustrated as including a pair of horizontal fins and a single vertical fin, this is for illustrative purposes only, as one of skill in the art will recognize that any number of fins positioned at any number of directions (including diagonally) can be incorporated herein with minimum effort.

Figure 2:
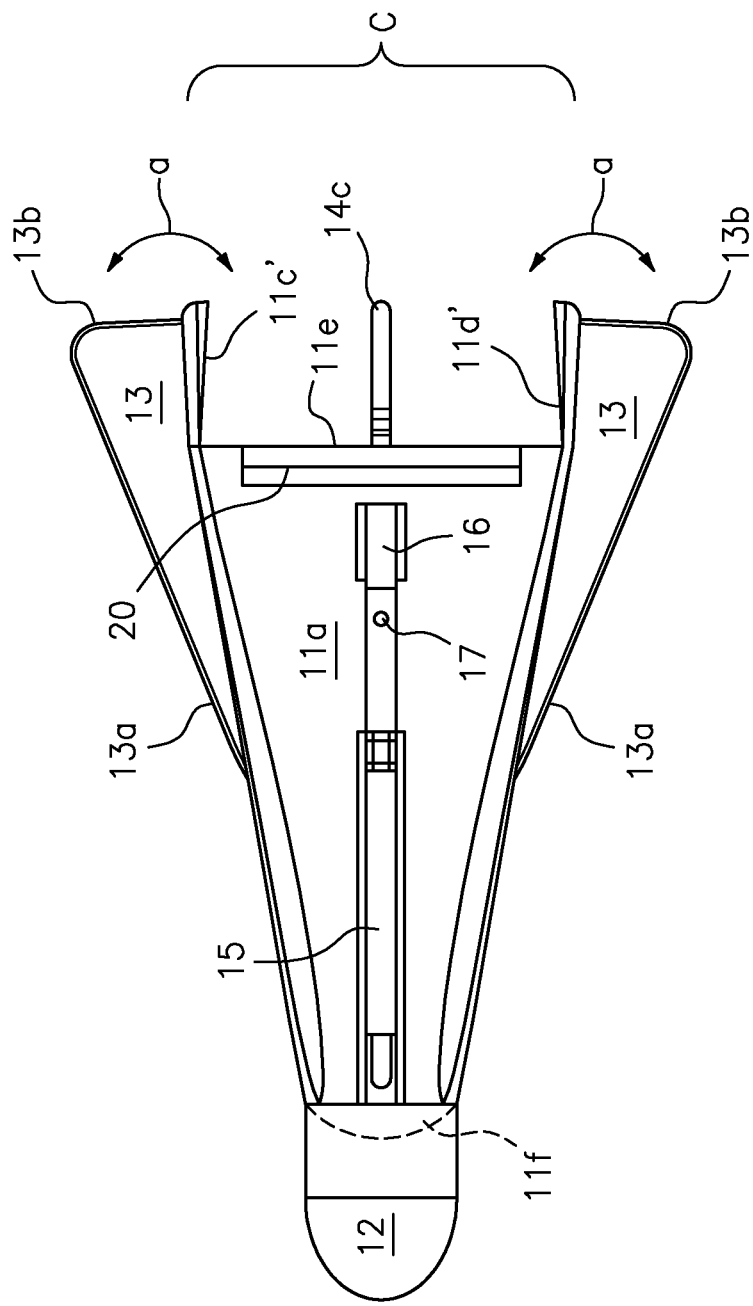
FIG. 2 is a top view of the device, according to one embodiment of the invention.
Figure 3:
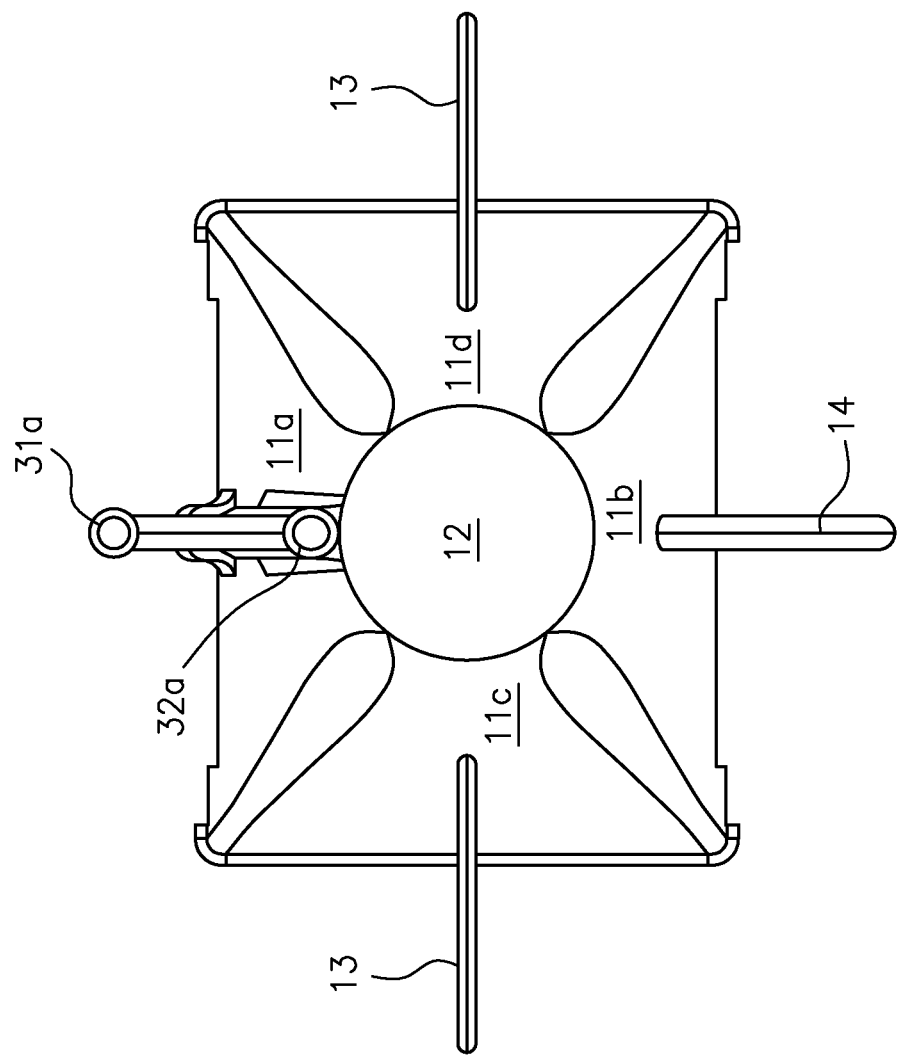
FIG. 3 is a front elevational view of the device, according to one embodiment of the invention.

As shown in FIG. 2, a camera clip 20 can be positioned along the back of the top section of the main body 11a, just above the rear wall 11e. Additionally, a generally C-shaped cavity approximating the size of a known camera 1 (either alone or inside a waterproof casing) can be formed along the back of the device. In one preferred embodiment, the cavity can be defined by the back section 11e, the top of the vertical fin 14 and the trailing edge of the opposing side sections 11c' and 11d', respectively. Additionally, it is preferred that each of the opposing side sections 11c' and 11d' be somewhat flexible (see arrow a) in order to allow the camera 1 to be positioned with the cavity C in a secure and hydrodynamically efficient manner.

Figure 4:
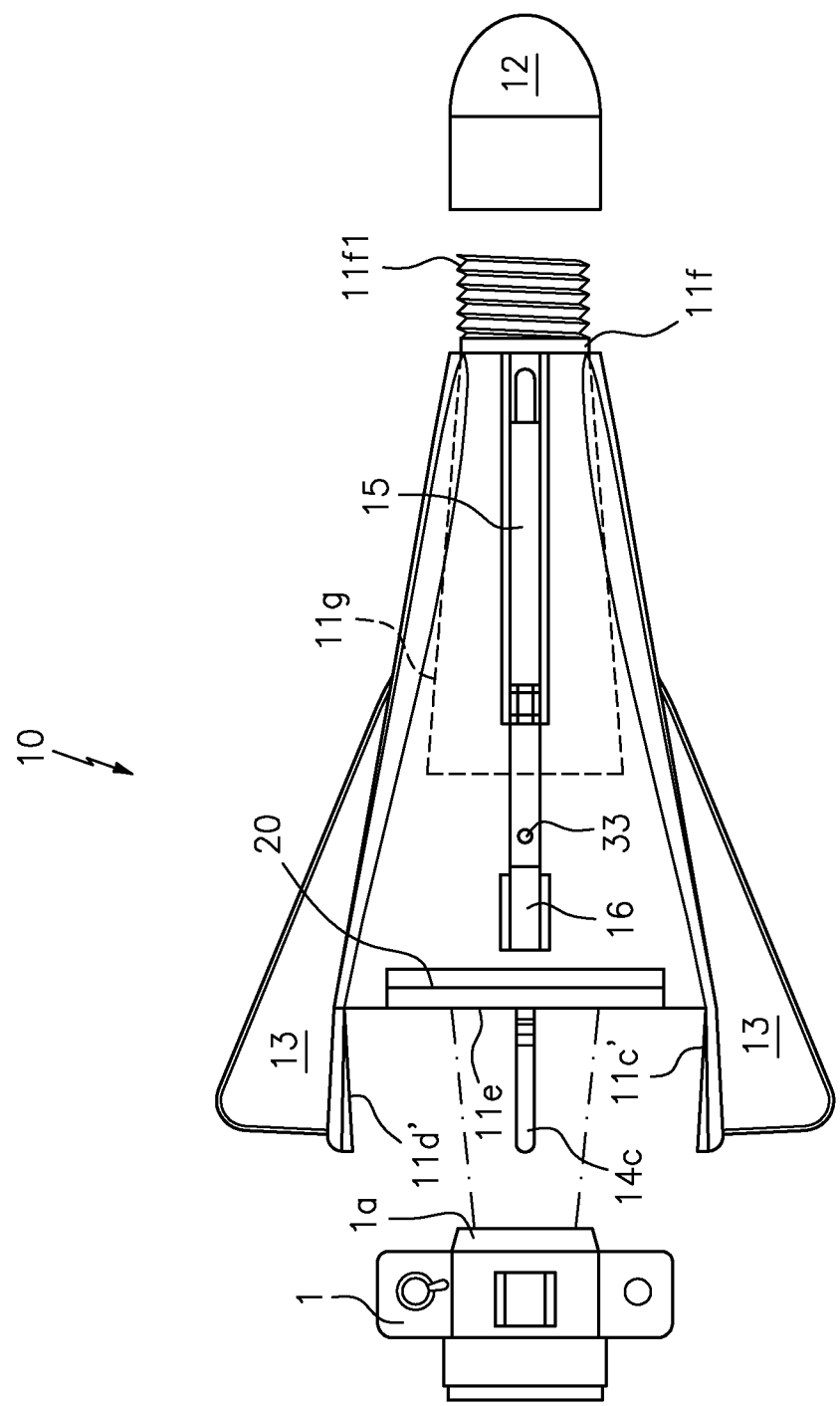
FIG. 4 is a partial exploded parts view of the device, according to one embodiment of the invention.

As described above, the clip 20 can include any number of traditional devices capable of removably securing two items together. For example, FIG. 4 illustrates one embodiment in which the clip 20 includes an elongated notch into which a corresponding protrusion 1a on the camera housing 1 can be placed. To this end, the clip 20 in combination with the cavity C, acts as a compression fitting for securely positioning the camera to the device, therefore preventing unintentional separation. Of course other conventional securing options such as magnets, adhesive, hook and loop fasteners (i.e. Velcro®), locking pins, thumb screws and general compression fittings, among other known options, can also be utilized.

In one embodiment, the device can further include a forward guide fin 15, a rear guide fin 16 and a plurality of guide channels 31a, 31b, 32a and 32b for allowing the device to be towed underwater. As shown best in FIG. 1, it is preferred that each of the guide fins 15 and 16 be serially aligned along the top center portion of the main body 11a. To this end, the forward guide fin 15 can include guide channels 31a and 32a stacked vertically, and the rear guide fin 16 can include guide channels 31b and 32b stacked vertically. In one embodiment, each of the guide channels 31a-31b and 32a-32b can be positioned serially in order to receive a guide line and to position the device at a desired angle when being towed (See FIGS. 7a and 7b below).

Additionally, the device can include a vertically oriented guide channel 33 extending from the top of the main body 11a, through the bottom of the main body 11b and can also exit the a trailing edge of the vertical fin 14b. In one embodiment, the vertical guide channel 33 can be utilized in conjunction with the forward guide fin 15 to position the device in a downward facing angle (See FIG. 8 below). Such a feature can be utilized for observing bait when the device is not in motion.

Although described above as including multiple guide fins at the top of the main body, this is for illustrative purposes only, as the device can include any number of guide fins located at any surface of the main body. Moreover, in another embodiment (not illustrated) additional guide channels can be included. These guide channels can be included vertically and horizontally throughout the main body.

As described herein, one or more elements of the towable directed-view underwater camera carrier 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the main body 11, the nosecone 12, the fins 13-16, and/or the guide channels 31-33, including all sub components, for example, may be formed together as one continuous element, either through manufacturing processes, such as welding, casting, or molding, or through the use of a singular piece of material milled or machined with the aforementioned components forming identifiable sections thereof. Accordingly, in one embodiment, each above described element of the towable directed-view underwater camera carrier 10 can be constructed from a single mold of injected plastic having a height and dimension suitable for use as described herein; however other materials such as composites, polymers and rigid plastic, among others, are also contemplated.

Figure 5:
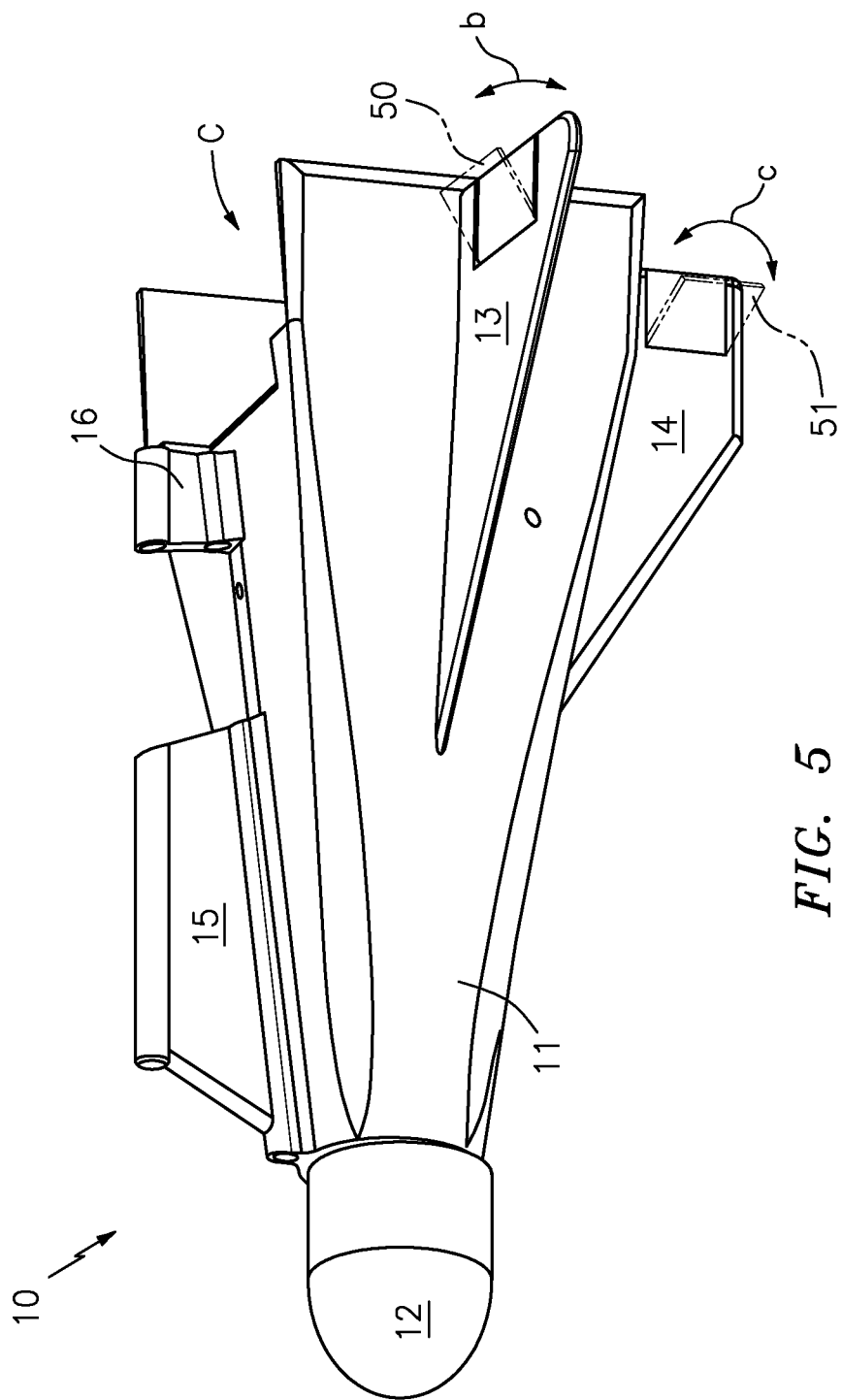
FIG. 5 is a perspective view of the device, according to an alternate embodiment of the invention.

FIG. 5 illustrates an alternate embodiment of the towable directed-view underwater camera carrier 10 described above in which each of the fins are individually adjustable.

As shown, each of the horizontal fins 13 can further include a steering flap 50, and the vertical fin 14 can include a rudder flap 51. To this end, lateral movement of the device 10 can be controlled by deflecting the rudder flap 51 (see arrow c), causing the device to turn to the right or left (i.e. "yaw"). Additionally, the depth and/or nose attitude of the device 10 can be adjusted by deflecting the steering flaps 50 (see arrow b), thereby causing the nose of the device to pitch up or down (i.e. "pitch").

As described herein, each of the steering flaps 50 and the rudder flap 51 can preferably include semi-rigid portions of the fin material capable of being bent or shifted in order to deflect water flowing over the fin in a desired direction, thereby causing the device to move in a predictable and controlled manner. However, other materials can be utilized instead of, or in addition to the fins in order to achieve the desired performance.

In an alternative embodiment (not illustrated) each of the fins 13 and 14 can be secured to the main body in a moveable manner resulting in the entire fin acting as a steering device (i.e. steering flap or rudder flap) for allowing a user to adjust the yaw and pitch of the device. Such a feature is useful, for instance, when deploying the device in high currents.

Figure 6:
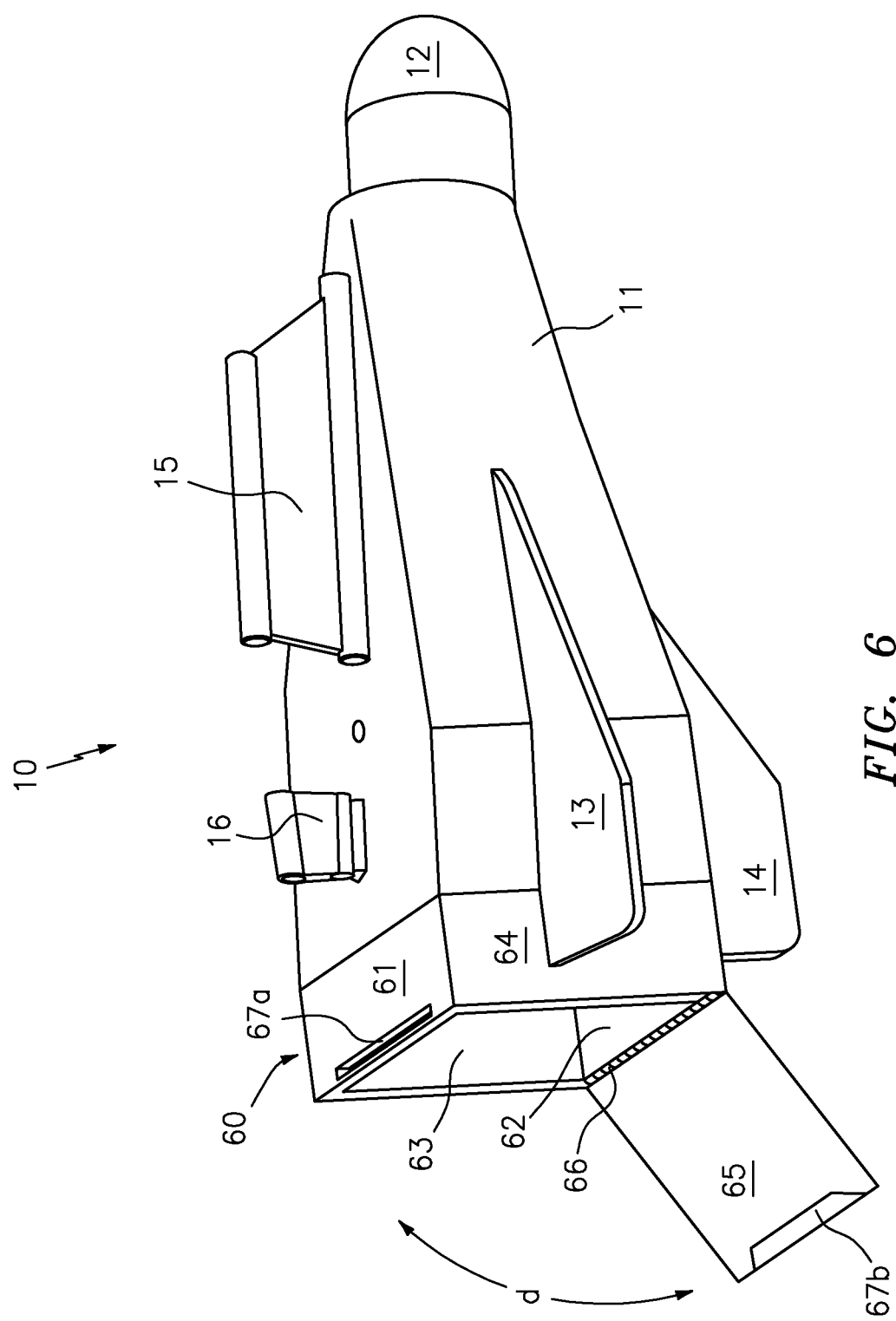
FIG. 6 is a perspective view of the device, according to another alternate embodiment of the invention.

FIG. 6 illustrates another alternate embodiment of the towable directed-view underwater camera carrier 10 described above, that further includes an integrated waterproof camera housing 60. In one preferred embodiment, the camera housing 60 will be permanently secured within the camera cavity C described above, and will include a top section 61, bottom section 62, opposing side sections 63 and 64, and a front section 65 secured to the housing via a waterproof hinge 66. As shown, the housing 60 can also include a conventional clip having a stub 67a and a latch 67b for securely closing the front section 65 when a camera is positioned therein (see arrow d). As described herein, camera housing 60 can preferably be constructed from any number of clear waterproof materials such as plastic, for example, capable of creating a watertight/waterproof environment for a camera, and having excellent optical clarity. Although, not illustrated, optional buttons and other such devices capable of operating the camera through the housing can also be included herein. These items being well and truly known in the art, no further description will be provided.

Although described above as including separate elements, one of skill in the art will recognize that camera housing elements 61-64 can be integrated into the design of the main body 11, and that a separate clear door and hinge (66 and 65) can be installed to complete the waterproofing.

In operation, the device 10 can act to position a camera 1, such as a still or motion picture device in a specific orientation underwater. In one example, the device can be secured to a conventional fishing line 5 and can be cast into the water using a conventional fishing pole. Owing to the hydrodynamic shape, the device can be reeled in without causing excessive drag, and can act to capture the interaction between the fish and bait. Of course, one of skill in the art will recognize that this is but one potential application for the device. Additionally, although described above as utilizing high strength fishing line, any number of conventional items such as rope, string, tethers and the like can be utilized as the guide line.

FIGS. 7a and 7b, illustrate one embodiment of the device 10 in operation as it moves through the water W. To this end, a guide line 5 can be positioned through the guide fins 14 and 15 via openings 31a and 32a, or 31b and 32b, respectively. One or more stoppers 6 (such as conventional swivel beads, or loops, for example) can be located before and after the guide fins for maintaining the device placement on the line 5. As shown, when inserted through channels 31a and 32a, the device move through the water in a nose down configuration while continuously aiming the camera on the lure 7. Likewise, when inserted through channels 31b and 32b, the device will orient the camera on the lure 7 at all times while remaining in a nose down configuration.

Figure 8:
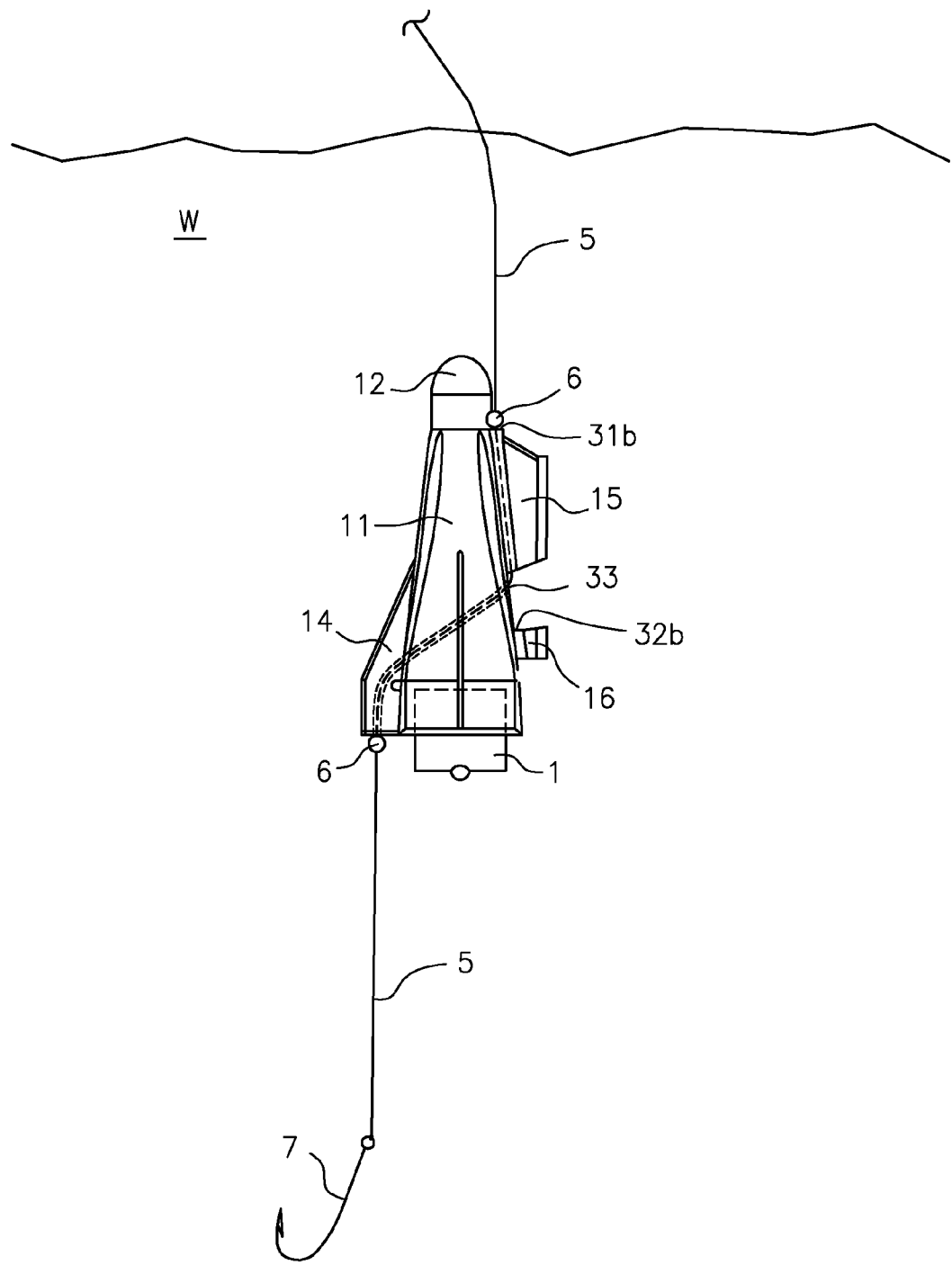
FIG. 8 illustrates the device in operation, in accordance with yet another embodiment.

FIG. 8 illustrate one embodiment of the device 10 in operation utilizing the vertical guide channel 33. As shown, guide channel 33 will act to position the device in a vertical manner under the water. Such a feature is useful in deep sea fishing, for example, where the bait is extremely heavy or in situations where it is desirable for the bait to hover in a stationary manner, or rest on the bottom for extended periods of time.

Finally, a plurality of illustrations (not illustrated) can also be imprinted on or emblazoned into the main body of the device. Such illustrations can include any number of colors, and/or markings as are appropriate for the intended use of the device. For example, in one embodiment, the device can include a color that closely resembles the color of the water, in order to reduce the visibility of the device. Alternatively, a face or other such marking can be included in order to make the device appear to be a fish. These are but two examples, as one of skill in the art will recognize that the choices for colors and markings are virtually endless.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A towable directed-view underwater camera carrier device for use while fishing, said device comprising:
a main body having a top surface, a bottom surface, opposing side surfaces, a front end and a rear end, said main body further including a pair of outwardly projecting horizontal fins and an outward projecting vertical fin, each of said horizontal and vertical fins being configured to stabilize the device when moving through a fluid;
a hydrodynamic bulbous nosecone secured to the front end of the main body;
at least one outward projecting guide fin positioned along the top of the main body, said guide fin including one or more channels configured to receive a tow line for moving the device under water;
a cavity positioned along the back end of the main body, said cavity being configured to securely hold at least one of an underwater camera and a waterproof camera housing; and
a pair of serially aligned guide fins secured to a top center portion of the main body, each of said guide fins including two channels configured to position the device at a plurality of different angles when moving through a fluid.

2. The camera carrier device of claim 1, wherein the main body comprises a generally frustum-like pyramid shape having a hollow cavernous interior, said interior being configured to receive ballast.

3. The camera carrier device of claim 2, wherein the nosecone is removably secured to the front end of the main body for providing access to the cavernous interior.

4. The camera carrier device of claim 1, further comprising:
a vertical guide channel extending from a top center portion of the main body to a rear section of the vertical fin positioned along the bottom of the main body, said vertical guide channel being configured to receive a tow line and orient the device in a generally vertical manner while underwater.

5. The camera carrier device of claim 1, further comprising:
   a clip secured to the top of the main body adjacent to the cavity, said clip being configured to removably lock the camera to the device.

6. The camera carrier device of claim 5, wherein said clip includes at least one of a compression fitting, hook and loop fasteners, magnets and adhesive.

7. The camera carrier device of claim 1, wherein each of the horizontal and vertical fins are independently adjustable.

8. The camera carrier device of claim 1, wherein each of the horizontal fins further includes a steering flap configured to adjust a pitch of the device while in motion.

9. The camera carrier device of claim 1, wherein the vertical fin further includes a rudder flap configured to adjust a yaw of the device while in motion.

10. The camera carrier device of claim 1, wherein the device is constructed from a single piece of injection molded plastic.

11. The camera carrier device of claim 1, further comprising a waterproof cavity having an access door for receiving a camera, said cavity being configured to position the camera in a rear facing direction.

12. The camera carrier device of claim 1, wherein the main body further includes one or more markings configured to disguise an identity of the device.

\* \* \* \* \*